United States Patent [19]

Forschirm

[11] Patent Number: 4,732,574

[45] Date of Patent: Mar. 22, 1988

[54] LUMINOSITY ENHANCEMENT OF TRIOXANE FUELS

[75] Inventor: Alex Forschirm, Parsippany, N.J.

[73] Assignee: Celanese Corporation, New York, N.Y.

[21] Appl. No.: 836,792

[22] Filed: Mar. 6, 1986

[51] Int. Cl.$^4$ .............................................. C10L 7/00
[52] U.S. Cl. .......................................... 44/7.1; 44/7.7
[58] Field of Search ................. 44/6, 7.1, 7.3, 7.5, 44/7.6, 7.7, 41, 60

[56] References Cited

U.S. PATENT DOCUMENTS

| | | | |
|---|---|---|---|
| 3,980,569 | 9/1976 | Pindar et al. | 44/75 X |
| 4,326,854 | 4/1982 | Tanner | 44/16 R |
| 4,347,062 | 8/1982 | Born et al. | 44/68 |
| 4,357,149 | 11/1982 | West et al. | 44/68 |
| 4,386,904 | 6/1983 | Miyahara et al. | 431/126 |
| 4,414,122 | 11/1983 | West et al. | 44/68 X |
| 4,454,059 | 6/1984 | Pindar et al. | 252/51.5 R |
| 4,500,439 | 2/1985 | West et al. | 44/76 X |
| 4,522,629 | 6/1985 | Horodysky et al. | 44/76 X |

*Primary Examiner*—Peter A. Nelson
*Attorney, Agent, or Firm*—Depaoli & O'Brien

[57] ABSTRACT

Trioxane based fuels have incorporated therein a sodium salt to enhance the luminosity of the flame. The mixture of trioxane and sodium provide a yellow flame compared to the substantially nonluminous blue flame of pure trioxane. Nontoxic sodium salts such as sodium acetate are uniformly mixed within the trioxane-based fuel.

5 Claims, No Drawings

LUMINOSITY ENHANCEMENT OF TRIOXANE FUELS

BACKGROUND OF THE INVENTION

This invention relates to novel solid heating fuels. In particular, the present invention involves enhancing the luminosity of the flame obtained from trioxane-based fuel.

Solid or gelled heating fuels have wide potential applications as convenient, easily handled and comparatively safe heat sources. Such solid heating fuels in portable form can be employed in civilian uses such as camping, outdoor cooking of all sort, fire-starting, emergency supplies, and the like. Solid heating fuels are also essential for military use, including the heating of field rations, etc.

A widely accepted form of solid heating fuel is trioxane either formed from a compacted solid powder with or without compaction aids such as magnesium stearate, a pure trioxane melt, or a trioxane melt mixed with an organic binder. Trioxane is a cyclic trimer of formaldehyde. Compacted or melted and then cooled to a solid form, trioxane fuel such as in the shape of pellets is advantageous in view of the lack of toxicity and ease of ignition of this fuel.

An important characteristic of trioxane fuel is its relatively low luminosity. Pure trioxane fuel burns with a clear blue flame. The low luminosity of trioxane fuel is advantageous for military applications such as for field use. However, it can readily be seen that trioxane fuel used as a portable heat source for domestic applications such as for outdoor cooking or for emergency light or heat supplies and the like presents a danger of accidental burning. Consequently, trioxane-based fuel has not found wide use as a domestic energy source.

While many compounds are known to impart luminosity to flames for decoration, such compounds frequently are unsafe or yield toxic combustion products. Thus, it would be advantageous to enhance the luminosity of the flame obtained from trioxane fuel without sacrificing the low toxicity of trioxane fuel. Such a safe and easy to use fuel would increase the desirability of trioxane for domestic applications.

U.S. Pat. No. 4,386,904 discloses a colored flame candle comprising a primary combustible material that burns with a colorless flame including trioxone, a combustion wick and a coloring wick. The combustion wick comprises a cotton yarn to which an oxidation accelerating catalyst such as platinum, palladium, and vanadium is added and the coloring wick which is separated but adjacent to the combustion wick comprises a flammable thread-like material, a metallic color former compound and an oxidation accelerating catalyst as well as a combustible resin coating. As the color forming compound which is carried by the coloring wick the examples are salts of metals such as cobalt, chromium, copper, potassium, sodium, lithium, manganese, antimony, calcium barium, strontium, cesium, rubidium, tin; lower carboxylates such as acetate, hydroxide, nitrate, carbonate; or higher fatty acid salts, such as stearate.

It is a primary object of the present invention to enhance the luminosity of the flame obtained from burning trioxane-based fuel.

A further object of the invention is to enhance the luminosity of the flame obtained from burning trioxane-based fuel without sacrificing the advantages of trioxane fuels such as the lack of toxicity and ease of ignition.

Still another object of this invention is to enhance the luminosity of the flame obtained from burning trioxane-based fuel so as to render trioxane fuel more safe and thus more desirable for domestic applications.

These and other objects, aspects, and advantages of the invention will be readily apparent to those of ordinary skill in the art on consideration of the following description of the invention.

SUMMARY OF THE INVENTION

In accordance with the present invention, the luminosity of the flame obtained from burning trioxane-based fuel is increased by the addition of a sodium salt to the trioxane fuel. It has been found that a sodium metal compound added to trioxane fuel provides a yellow flame of good luminosity and thus renders the trioxane fuel more safe for use in domestic applications. Importantly, certain sodium salts are general purpose food additives and nontoxic and, thus, when added to a trioxane-based fuel not only provide luminosity enhancement, but leave a residue which is unchanged from the original starting material and is nontoxic. Sodium acetate is an example of a nontoxic luminosity enhancement additive.

DETAILED DESCRIPTION OF THE INVENTION

The trioxane-based fuel is a cyclic trimer of formaldehyde. Trioxane has a molecular weight of 90 and melts at a temperature of 61°-62° C. Many methods are known for forming trioxane from formaldehyde and separating the product from the formaldehyde reactant. The particular method of forming trioxane and method of separation to obtain pure trioxane product are well known to those of ordinary skill in the art and, thus, do not form important features of the present invention. The only importance which exists with regard to the source of trioxane, is that when the trioxane is melted for shaping into the desired form, the liquid should be clear and the tendency to gel or lump should be minimized for ease of shaping. Compaction of solid powder into the desired form may also be used. Known compaction aids may be used.

Similarly, the particular shape of the solidified trioxane fuel is not critical. Thus, solidified trioxane fuel in the shape of bars, pellets, candles, etc. are useful in the present invention. As can readily be determined, the solidified trioxane fuel can be shaped to fill various domestic needs. For example, for outdoor use such as in camping, the trioxane fuel can be shaped in pellet form for use in cooking such as heating water or other prepared foods. The trioxane fuel can be in the shape of cylinders or candle-like form to provide heat and/or light. Similarly, the trioxane fuel can be shaped for use in the household such as in candle form to provide light as well as in the larger log form as a starting log for fireplace use or for providing a decorative fire for light and heat. Although a wick can be added, in the preferred use of the trioxane-based fuel, i.e. portable heat source for cooking, a wick is not required. For use as a portable heat source, the trioxane fuel provided in the shape of 10-30 gram pellets has been found satisfactory.

The luminosity enhancement additive is a sodium compound, preferably a metallic salt. Examples include sodium salts of lower alkyl carboxylates, and dicarboxylates, e.g. $C_1$-$C_6$ alkyls; carbonates; halides; or fatty acids, such as stearate; and the hydrates thereof. The preferred sodium salts are those that are nontoxic. Several sodium salts are general purpose food additives, e.g. sodium acetate, sodium bicarbonate, and, thus used in small amounts provide for flame luminosity and are nontoxic. Sodium acetate and hydrated sodium acetate are the preferred flame luminosity enhancement additives.

Besides nontoxicity, another desired characteristic of the flame luminosity enhancement additive found useful in the present invention is a density which allows the additive to be uniformly dispersed within the trioxane-based fuel without excessive settling. Thus, sodium salts having specific gravities of less than about 2 are preferred. Such sodium salts include sodium acetate, sodium acetate trihydrate, sodium carbonate decahydrate, sodium carbonate heptahydrate, sodium citrate pentahydrate, and sodium acid pyrophosphate.

The sodium luminosity enhancement additive can be incorporated in the trioxane fuel in several ways. Thus, the sodium salt may be mixed with the trioxane fuel prior to shaping in its desired form. Alternatively, the sodium salt may be coated onto the surface of the shaped trioxane fuel such as by spraying, dipping, brushing, and the like. If a wick is added, the sodium salt may be incorporated by coating the wick or by impregnation. Preferably, the sodium salt is mixed with molten or compacted powdered trioxane and shaped without a wick.

The amount of sodium salt which must be added to provide the luminous flame is not critical as only minor amounts need be added. Generally, about 0.1 to about 5 wt. % of the sodium salt relative to the luminous fuel is sufficient. Preferably, around 1 wt. % is sufficient to provide adequate flame luminosity.

The following example offers a comparison of the luminosity of the flame obtained from trioxane-based fuel containing various additives. The invention should not be construed as being limited by the specific examples which yield the desired increase in luminosity.

EXAMPLE

In this example, three additives were tested to determine whether the trioxane flame luminosity could be increased and made safe for domestic application. For each sample, 15 grams of freshly melted trioxane liquid was placed into an aluminum dish. The flame enhancement additives were added therein, the mixture cooled and ignited.

Sodium chloride was added in an amount of about 1 wt. %. A yellow flame was produced. However, the salt settled to the bottom of the fuel. Sodium chloride has a specific gravity of 2.165.

About 1 gram of 2 octanol was pipetted onto the cooled tablet so as to substantially coat the surface thereof. Upon ignition, there was no enhancement of flame luminosity over pure trioxane fuel.

About 1 wt. % sodium acetate trihydrate was added to the liquid trioxane fuel and mixed therein. Upon ignition, a luminous yellow flame was produced. There was less tendency of sodium acetate to settle to the bottom as the sodium chloride additive. Approximately, 0.5 wt. % of the starting additive was left as a residue. This residue was tested as containing sodium acetate trihydrate identical to the starting material.

What is claimed is:

1. A trioxane-based solid fuel having improved flame luminosity comprising trioxane and 0.1 to about 5 wt. % based on said fuel of a sodium salt wherein said sodium salt has a specific gravity of less than 2.00 and said salt is mixed within the trioxane-based solid fuel.

2. The trioxane fuel of claim 1 containing 10–30 gram pellets.

3. The trioxane fuel of claim 1 wherein said sodium salt is nontoxic.

4. The trioxane fuel of claim 3 wherein said sodium salt comprises sodium acetate or the hydrate thereof.

5. The trixane fuel of claim 4 wherein said sodium salt comprises sodium acetate trihydrate.

* * * * *